United States Patent [19]

Mott

[11] 4,004,436

[45] Jan. 25, 1977

[54] DRIVE LINE SAFETY SHIELD

[75] Inventor: Roger Eugene Mott, Bettendorf, Iowa

[73] Assignee: Deere & Company, Moline, Ill.

[22] Filed: July 24, 1975

[21] Appl. No.: 598,852

[52] U.S. Cl. .................................. 64/32 R; 64/4; 64/6; 403/23
[51] Int. Cl.² ........................................ F16D 3/84
[58] Field of Search ................. 64/32 R, 32 F, 6, 4; 403/23

[56] References Cited

UNITED STATES PATENTS

| | | | |
|---|---|---|---|
| 3,091,101 | 5/1963 | Atkinson | 64/4 |
| 3,111,821 | 11/1963 | Edwards et al. | 64/4 |
| 3,418,828 | 12/1968 | Carns | 64/4 |
| 3,503,225 | 8/1970 | Shindelar et al. | 64/4 |

*Primary Examiner*—Samuel Scott
*Assistant Examiner*—Randall Heald

[57] ABSTRACT

A drive line, such as is used in agricultural equipment to drive various components, includes a rotating driveshaft that is connected to a driven shaft through a slip clutch that is coaxial with the two shafts and has clutch components that extend radially outwardly of the drive and driven shafts. A tubular shaft shield is coaxially and rotatably mounted around the drive shaft adjacent the clutch and includes an element with an annular external groove adjacent the clutch. A second tubular shield is coaxially mounted on the shaft shield and includes a bell-shaped housing that normally encloses the clutch, the outer shield having an internal annular groove opposite the external groove and being rotatable on and axially shiftable relative to the shaft shield. A plastic snap ring is mounted in the internal groove and seats in the external groove to axially lock the outer shield to the inner shield, the snap ring expanding upon the exertion of a predetermined amount of axial force on the outer shield to unseat from the external groove and permit axial shifting of the outer shield to a position wherein it provides access to the clutch components.

7 Claims, 2 Drawing Figures

DRIVE LINE SAFETY SHIELD

BACKGROUND OF THE INVENTION

This invention relates to an improved drive line safety shield and more particularly to an improved mounting for a safety shield to provide quick access to a drive line component, such as a slip clutch.

It is conventional to provide shielding for exposed drive lines in machinery such as agricultural harvesting machines. Such machines frequently utilize slip clutches or the like in the machinery drive lines to protect the driven components, and it is necessary to provide shielding for such components as well as for the rotating shafts. However, access to such components as slip clutches is frequently necessary for adjustment or maintenance of the component, and in some cases it has been found that when access is difficult due to the shielding, the operator removes the shielding and leaves it off, leaving a dangerous condition.

SUMMARY OF THE INVENTION

According to the present invention, there is provided an improved drive line safety shield for a drive line having a component such as a clutch or the like, wherein the shield for the clutch or the like is quickly and easily shifted to a position to provide access to the component and is similarly easily shiftable back to a position wherein it shields the component. More specifically, a snap ring is provided to lock the shield for the component in its normal position, the snap ring unseating upon exertion of a predetermined amount of axis force on the shield to permit axial shifting of the shield to a retracted position. Also, the shield is easily shifted back to its normal position by simple axial adjustment of the shield, the snap ring easily returning to its position wherein it locks the shield in place.

An important feature of the invention resides in the simple, durable, and inexpensive construction of the shielding.

DESCRIPTION OF THE PREFERRED EMBODIMENT

Figure 1:
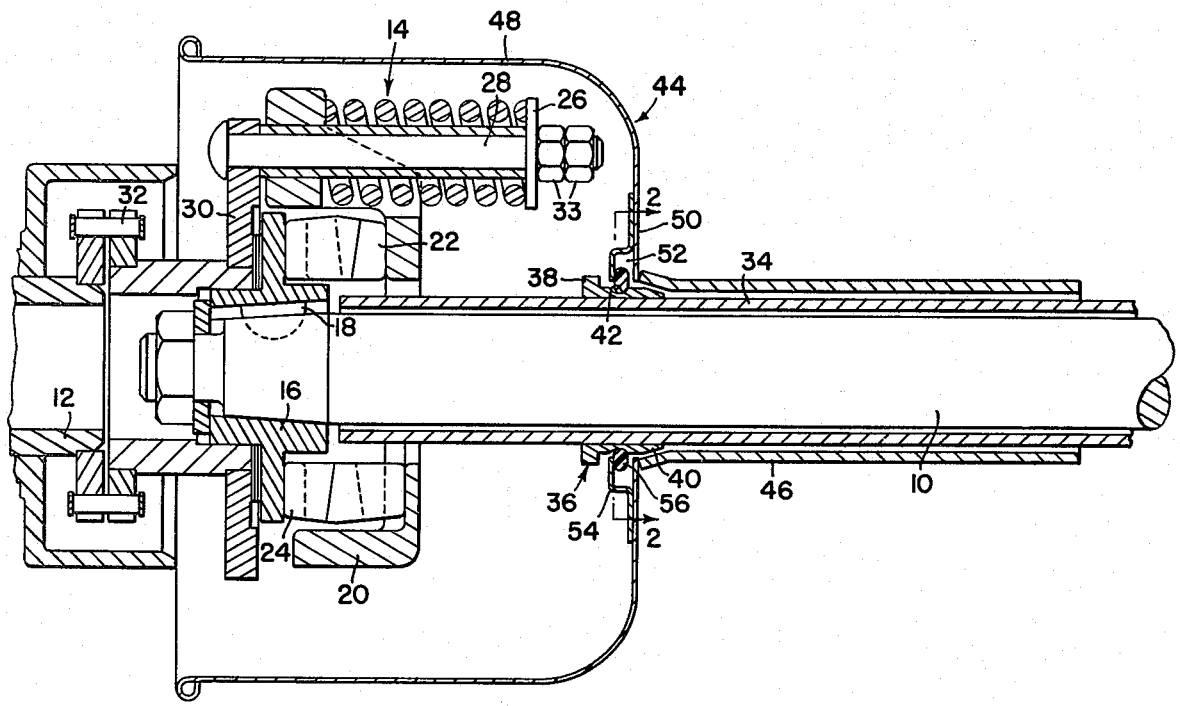
FIG. 1 is an axial section through a drive line and shielding therefor embodying the invention.

The invention is embodied in a drive line that includes a drive shaft 10, which is connected to a driven shaft 12 by means of a slip clutch, indicated in its entirety by the numeral 14. The slip clutch is of known construction and includes a drive member 16 keyed to the end of the drive shaft 10 by a key 18. The slip clutch includes an axially shiftable element 20 carrying an annular cam 22 that meshes with a similar cam 23 on the drive member 16. As is well known, the cams are biased against one another by a plurality of springs 24, only one of which is shown. The springs operate between the shiftable element 20 and an adjustable stop 26 on the end of a bolt 28, that extends parallel to the axis of the clutch from a radially extending driven member 30, which in turn is connected to the driven shaft 12 by a connector 32. As is well known, when the torque transmitted through the slip clutch 14 exceeds a predetermined amount, the shiftable element 20 shifts against the bias of the springs 24 as a result of the action between the cams 22 and 23 so that the driven shaft 12 stays stationary while the drive shaft continues to rotate. As is also well known, the amount of driving force transmitted through the slip clutch can be adjusted by changing the pre-load on the springs by means of the adjustable stop 26, which is adjusted by turning a pair of stop nuts 33 on the end of the bolt 28.

A tubular shaft shield 34 is coaxially mounted on and rotatable on the drive shaft 10, the shield 34 extending to the slip clutch drive member 16. Mounted on the shield 34 a short distance from the end of the shield is an annular member 36, that includes a shoulder 38 on the end nearest the slip clutch. The annular member has an inwardly tapered surface 40 at its end opposite the shoulder 38, the tapered surface tapering inwardly away from the slip clutch so that the end of the annular member is only slightly larger in diameter than the shaft shield 34. Between the tapered surface 40 and the shoulder 38 is an external annular groove 42 having a generally semicircular cross section.

A bell-shaped clutch shield 44 is coaxially and rotatably mounted on the shaft shield 34 and includes a tubular neck portion 46 having an internal diameter slightly larger than the external diameter of the shaft shield 34. The clutch shield also includes an enlarged cylindrical portion 48, that normally encompasses the slip clutch 14 and has a radial end wall 50 connected to the end of the neck portion 46, the opposite end of the cylindrical portion being open as shown in FIG. 1. The clutch shield has an internal annular groove 52 adjacent the junction of the neck portion 46 and the enlarged cylindrical portion 48, the groove 52 being formed by an annular plate 54 having its outer periphery attached to the end wall 50 and its inner periphery offset axially from the end wall.

As shown in FIG. 1, when the clutch shield 44 is in its normal operating position, the internal groove 52 is opposite the external groove 42 on the annular member 36, and a snap ring 56, which is preferably made of plastic, is coaxially disposed in the groove 52 and seats in the external groove 42 to axially lock the clutch shield 44 to the shaft shield 34.

Figure 2:
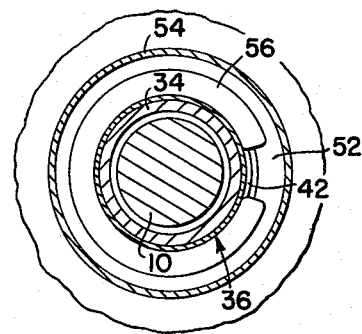
FIG. 2 is a radial section as viewed along the line 2—2 of FIG. 1.

As shown in FIG. 2, the snap ring 56 extends for approximately 330 degrees and has a normal undeflected inner diameter that is substantially the same as the inner diameter of the groove 42. As is well known, such snap rings are expandable to increase their inner diameter, and the ring 56 can be deformed to such an extent that it leaves the groove 42 while still being maintained in the internal groove 52.

In operation, the clutch shield is normally locked in the position shown in FIG. 1 by the snap ring 56, which seats in the groove 42 in the annular member 36, the enlarged cylindrical portion 48 of the shield encompassing the slip clutch 14. To expose the slip clutch for adjustment or maintenance, the neck portion 46 is simply grasped and an axial force is exerted on the clutch shield 44 away from the slip clutch. The characteristics of the snap ring 56 and the shape of the groove 42 are such that a relatively small amount of axial force on the clutch shield causes the snap ring 56 to expand, so that it rides out of the groove 42 to unlock the clutch shield and permit shifting of the clutch shield to a position wherein the slip clutch 14 is exposed.

To reposition the clutch shield in its normal or operating position, the operator simply exerts an axial force on the clutch shield toward the slip clutch, the snap ring 56 being carried in the internal groove 52 and sliding along the exterior of the shaft shield 34 until it engages the tapered surface 40 of the annular member 36. The tapered surface 40 causes the snap ring 56 to expand in response to additional axial movement of the shield until the snap ring is again opposite the external groove 42, at which time the snap ring retracts into the groove to again lock the shield in its normal position.

I claim:

1. In a drive line including a rotating shaft and a rotating drive component coaxially connected to the shaft, an improved safety shield comprising: a rotatable tubular shaft shield coaxially and rotatably mounted around the shaft adjacent the drive component and including an annular element on the exterior of the shaft shield having an external annular groove around its periphery; a rotatable tubular component shield having an enlarged portion at one end and a neck portion at the other and being coaxially and rotatably mounted on the shaft shield and axially shiftable thereon between a normal position, wherein the enlarged portion encompasses the drive component, and a retracted position wherein the shield is clear of the component to provide access thereto, said component shield having an internal annular groove; and a snap ring mounted in the internal component shield groove and seatable in the external groove to axially lock the component shield on the shaft shield in its normal position, the snap ring being expandable in response to the exertion of a predetermined amount of axial force on the component shield to clear the external groove and permit axial shifting of the component shield to its retracted position.

2. The invention defined in claim 1 wherein the snap ring is made of resilient, plastic material.

3. The invention defined in claim 1 wherein the internal annular groove on the component shield is located adjacent to the juncture of the enlarged portion and the neck portion of the shield.

4. The invention defined in claim 1 wherein the annular element includes an inwardly tapered surface on the opposite side of the external groove from the drive component, the tapered surface engaging the inside of the snap ring as the component shield is shifted from its retracted position to its normal position to expand the snap ring so that it moves along the annular member until it reaches the external groove and it retracts into the groove.

5. The invention defined in claim 4 wherein the internal annular groove on the component shield is located adjacent to the juncture of the enlarged portion and the neck portion of the shield.

6. The invention defined in claim 5 wherein the snap ring is made of resilient, plastic material.

7. The invention defined in claim 4 wherein the snap ring is made of resilient, plastic material.

* * * * *